United States Patent
Sadi et al.

(10) Patent No.: US 9,622,258 B2
(45) Date of Patent: Apr. 11, 2017

(54) METHOD FOR GENERATING A TIME TABLE FOR SENSORS

(71) Applicant: Koc Universitesi, Sariyer, Istanbul (TR)

(72) Inventors: Yalcin Sadi, Bursa (TR); Sinem Coleri Ergen, Istanbul (TR)

(73) Assignee: KOC Universitesi, Istanbul (TR)

( * ) Notice: Subject to any disclaimer, the term of this patent is extended or adjusted under 35 U.S.C. 154(b) by 41 days.

(21) Appl. No.: 14/424,895

(22) PCT Filed: Aug. 26, 2013

(86) PCT No.: PCT/EP2013/067648
§ 371 (c)(1),
(2) Date: Feb. 27, 2015

(87) PCT Pub. No.: WO2014/033093
PCT Pub. Date: Mar. 6, 2014

(65) Prior Publication Data
US 2015/0215960 A1 Jul. 30, 2015

(30) Foreign Application Priority Data
Aug. 28, 2012 (TR) .................. 2012/09868

(51) Int. Cl.
*H04W 4/00* (2009.01)
*H04W 72/12* (2009.01)
(Continued)

(52) U.S. Cl.
CPC ..... *H04W 72/1242* (2013.01); *H04L 12/4035* (2013.01); *H04W 72/10* (2013.01); *H04W 72/0446* (2013.01); *H04W 84/18* (2013.01)

(58) Field of Classification Search
CPC ......... H04W 72/1242; H04W 72/0446; H04W 72/10; H04W 84/18; H04L 12/4035
See application file for complete search history.

(56) References Cited

U.S. PATENT DOCUMENTS 6,963,817 B2 * 11/2005 Ito ....................... F16K 37/0091
702/138
2001/0052695 A1 * 12/2001 Stierle .................... B60R 21/01
280/735

(Continued)

OTHER PUBLICATIONS

ElBatt, T., Saraydar, C., Ames, M., Talty, T., "Potential for Intra-Vehicle Wireless Automotive Sensor Networks," Sarnoff Symposium, Mar. 27, 2006, pp. 1-4, IEEE, Piscataway, NJ, USA XP031266807, ISBN: 978-1-4244-0002-7.

(Continued)

*Primary Examiner* — Kevin Mew
(74) *Attorney, Agent, or Firm* — Brinks Gilson & Lione

(57) ABSTRACT

A method for generating a time table determines the data exchange times between a control unit and wireless sensors in a vehicle, which includes said control unit. The wireless sensors detect properties of components of the vehicle and/or surrounding parameters, and carrying out data exchange with the control unit by establishing a wireless connection with at least one wireless port provided in the control unit. The method can include calculating the data exchange periods and/or the data exchange durations between each sensor and the control unit; generating a time table having an adjustable table length according to the data exchange periods and/or data exchange durations; splitting the time table into subunits according to the data exchange periods and/or data exchange durations; and entering the times at which each sensor performs data exchange with the control unit into the table according to a predefined priority order.

11 Claims, 2 Drawing Sheets

(51) Int. Cl.
*H04L 12/403* (2006.01)
*H04W 72/10* (2009.01)
*H04W 84/18* (2009.01)
*H04W 72/04* (2009.01)

(56) References Cited

U.S. PATENT DOCUMENTS

| | | | | |
|---|---|---|---|---|
| 2005/0183023 | A1* | 8/2005 | Maruyama | A47B 21/00 715/759 |
| 2007/0063833 | A1* | 3/2007 | Kates | G08B 25/009 340/521 |
| 2007/0159321 | A1* | 7/2007 | Ogata | A61B 5/0002 340/539.12 |
| 2008/0303897 | A1* | 12/2008 | Twitchell, Jr. | B65D 88/121 348/61 |
| 2009/0012693 | A1* | 1/2009 | Kalweit | F02D 41/18 701/102 |
| 2009/0204310 | A1* | 8/2009 | Gittere | G07C 5/008 701/102 |
| 2009/0207769 | A1 | 8/2009 | Park et al. | |
| 2010/0013436 | A1* | 1/2010 | Lowenthal | G06Q 30/04 320/109 |
| 2010/0296478 | A1 | 11/2010 | Hogenmueller et al. | |
| 2012/0015594 | A1* | 1/2012 | Yenneti | B60H 1/00742 454/75 |
| 2012/0235624 | A1* | 9/2012 | Sisk | H01M 2/1072 320/101 |
| 2014/0180639 | A1* | 6/2014 | Cheatham, III | G06F 21/629 702/189 |

OTHER PUBLICATIONS

Nguyen, D.T., Singh, J., Le, H.P., Soh, B., "A Hybrid TDMA Protocol Based Ultra-Wide Band for In-car Wireless Communication," TENCON 2009, Jan. 23, 2009, pp. 1-7, IEEE Region 10 Conference, Piscataway, NJ, USA XP031617354, ISBN: 978-1-4244-4546-2.

Ahmed,M., Saraydar, C.U., ElBatt, T., Talty, T., Ames, M., "Intra-vehicular Wireless Networks", Globecom Workshops, Nov. 1, 2007, pp. 1-9, 2007 IEEE, XP031207107, ISBN: 978-1-4244-2024-7.

International Search Report and Written Opinion of the International Searching Authority, dated Jan. 12, 2015, pp. 1-16, issued in International Application No. PCT/EP2013/067648, European Patent Office, Rijswijk, The Netherlands.

* cited by examiner

L ↘

| S1 | S2 | S4 | | S1 | S3 | | S1 | S2 | S4 | | S1 | S3 | |

| S1 | S2 | S4 | | S1 | S3 | S5 | | S1 | S2 | S4 | | S1 | S3 | |

| S1 | S2 | S4 | | S1 | S3 | S5 | | S1 | S2 | S4 | | S1 | S3 | S6 |

Figure – 7

METHOD FOR GENERATING A TIME TABLE FOR SENSORS

FIELD OF INVENTION

The present invention relates to a method for generating a time table for regulating the communication of on-board wireless sensors.

BACKGROUND

Cars, buses, trucks and similar vehicles are equipped with sensors which detect the status of components thereof and/or surrounding factors. For instance, sensors which detect the internal pressure of a tire or the distance between some objects in the surrounding and the vehicle itself provide for a safe use of the vehicles. The sensors according to the prior art are connected to a control unit using wire-like electrical conducting lines and transmit the detected data to the control unit accordingly. However, with the recent developments in technology, wireless communication has been introduced to carry out the data exchange between the control unit and the sensor. Wireless communication is particularly useful in exchanging data between the control unit and the sensor when wire communication is not feasible (e.g. when a connection is established between a sensor disposed in a tire and the control unit). Additionally, wireless communication makes it further possible to reduce the mess caused by the gears or the harness.

On the other hand, wireless sensors increase the software requirements within the vehicle. More specifically, since the number of sensors is restricted with which a control unit establishes communication at the same time, the timing of data exchange conducted between the control unit and the sensors should be regulated. However, since the data transmission frequencies and the data transmission times of each sensor may be different, regulating the data exchange times of the sensors is a challenging process. In addition, the data transmission frequency and/or the data transmission time of even the same sensor can change in time. Because of these variations, the quality of the data exchange between the sensor and the control unit may drop, or some of the data transmitted by the sensor cannot even reach the control unit.

SUMMARY

A method according to the present disclosure for generating a time table determining the data exchange times between at least one control unit and at least two wireless sensors in a vehicle which comprises said at least one control unit for controlling the functioning of the vehicle; and said at least two wireless sensors detecting the properties of components and/or surrounding parameters and suitable for carrying out data exchange with the control unit by establishing wireless connection with at least one wireless port provided in the control unit, said method comprising the steps of calculating the data exchange periods and/or the data exchange durations between each sensor and the control unit; generating a time table having an adjustable table length according to the calculated and/or predetermined data exchange periods and/or data exchange durations; splitting the time table into subunits according to the calculated and/or predetermined data exchange periods and/or data exchange durations; and entering the times at which each sensor is to perform data exchange with the control unit into the table according to a predefined order of priority.

The method according to the present disclosure makes it possible to perform a regular data exchange between the wireless sensors and the control unit provided in the vehicle using a single time table. Additionally, by updating the time table with actual information and leaving empty times in the subunits of the time table, a safe data exchange can be made even when a change occurs in the data exchange durations and periods between the sensor and the control unit.

An interesting aspect of embodiments is to develop a method for generating a time table for determining the data exchange times between wireless sensors and a control unit in a vehicle.

Another interesting aspect of embodiments is to develop a method for generating a time table ensuring a high-quality data exchange between wireless sensors and a control unit.

Still another interesting aspect of embodiments is to develop a method for generating a time table reducing the data exchange duration between wireless sensors and a control unit.

DESCRIPTION OF FIGURES

Illustrative embodiments of the method for generating a time table are illustrated in the accompanying figures briefly described below.

FIGS. 2-7 are representative schemas to which the communication times of the sensors are entered.

Figure 1:
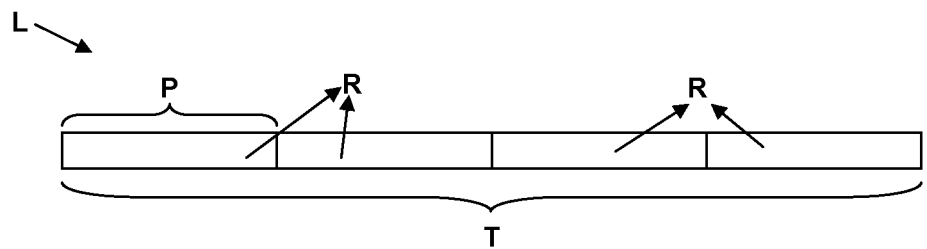
FIG. 1 is a representative schema of an empty time table generated by the method.

The components in said figures are individually designated as following.

| | |
|---|---|
| Time table | (L) |
| Table length | (T) |
| Subunit | (R) |
| Subunit length | (P) |
| First sensor | (S1) |
| Second sensor | (S2) |
| Third sensor | (S3) |
| Forth sensor | (S4) |
| Fifth sensor | (S5) |
| Sixth sensor | (S6) |

DETAILED DESCRIPTION

Various sensors are used in vehicles such as cars, busses, trucks, etc. to detect some selected properties of the vehicle components (e.g. internal pressure of tires or engine revolution) and/or some selected surrounding parameters (e.g. the distance to another vehicle in front). To reduce the mess caused particularly by the wire harness, these sensors may be in the form of wireless sensors capable of establishing wireless communication (e.g. according to the standards of, for example, Wireless-HART, ISA-100, or IEEE 802.15.4) with a control unit. However, since the number of wireless sensors is restricted with which the control unit is to perform data transfer at once, the data transfer between the wireless sensors and the control unit should be performed according to a defined timing schedule. In this context, a method is developed here for generating a time table regulating the data exchange times between wireless sensors and a control unit in a vehicle.

Thus, the method generates a time table determining the data exchange times between at least one control unit and at least two wireless sensors in a vehicle which comprises said at least one control unit for controlling the functioning of the vehicle; and said at least two wireless sensors detecting the properties of components and/or surrounding parameters and suitable for carrying out data exchange with the control unit by establishing wireless connection with at least one wireless port provided in the control unit. The method comprises the steps of calculating the data exchange periods and/or the data exchange durations between each sensor and the control unit; generating a time table (L) having an adjustable table length (T) according to the calculated and/or predetermined data exchange periods and/or data exchange durations; splitting the time table (L) into subunits (R) according to the calculated and/or predetermined data exchange periods and/or data exchange durations; and entering the times at which each sensor is to perform data exchange with the control unit into the table according to a predefined order of priority. In the step of calculating the data exchange durations between each sensor and the control unit, an optimum data transmission power and accordingly the data transmission speed for each sensor is so calculated that the energy requirements of the sensor is met and the data packet transmission duration is minimized. It is hereby ensured that the data exchange process is completed in a short time.

In an embodiment, the length of the time table (L) is determined to be equal to the data transmission period of that sensor having the longest data transmission period. It is hereby ensured that the time table (L) can be repeatedly used. In other words, once some time elapses from the beginning to the end of the time table (L), it may be turned back to the beginning of the time table (L). This, in turn, makes it possible to use a single time table (L) for a plurality of sensors in place of using complex time tables.

In another preferred embodiment, the lengths of each subunit (P) of the time table (L) are equal. According to this embodiment, the subunit length (P) is preferably equal to the data transmission period of that sensor having the shortest data transmission period. Accordingly, it is ensured that even the sensor having the smallest data transmission period makes a periodic data exchange with the control unit when the sensors are placed into the time table (L).

In a further preferred embodiment, the order of priority in the step of entering the times at which each sensor is to perform data exchange with the control unit into the table according to a predefined order of priority is calculated based on the data exchange period and/or the data exchange duration of each sensor. According to this embodiment, the predefined order means that the sensor having the shortest data exchange period is placed first into the table and that the sensor having the longest data exchange period is placed last into the table. Considering the sensors having identical data exchange periods, in turn, these are placed to the time table (L) according to another order of priority. In this manner, it is ensured that each sensor is placed to the table.

According to another preferred embodiment, during the step of entering the times at which each sensor is to perform data exchange with the control unit into the table according to a predefined order of priority, each sensor is placed to that subunit (R) first which has the greatest empty time. Then, the respective sensor will also be placed to other subunits (R) in a periodical manner. Thus, after all sensors are placed to the subunits (R), times gaps are left in each subunit (R) such that when a lag occurs in a sensor, this lag can be compensated by virtue of the time gaps or empty times in the subunits (R) without an overflow or expansion occurring in the respective subunit (R). In other words, the time table (L) is rendered flexible against the lags of sensors.

An exemplary embodiment of the method for generating a time table (L) is given in FIGS. 1-7. In this example, 6 sensors are placed into a time table (L). The data exchange periods and the data exchange durations of the sensors are given in table 1.

TABLE 1

| Sensor | Data exchange period | Data exchange duration |
|---|---|---|
| First sensor (S1) | 1 ms | 0.2 ms |
| Second sensor (S2) | 2 ms | 0.3 ms |
| Third sensor (S3) | 2 ms | 0.4 ms |
| Forth sensor (S4) | 2 ms | 0.2 ms |
| Fifth sensor (S5) | 4 ms | 0.3 ms |
| Sixth sensor (S6) | 4 ms | 0.2 ms |

Figure 2:
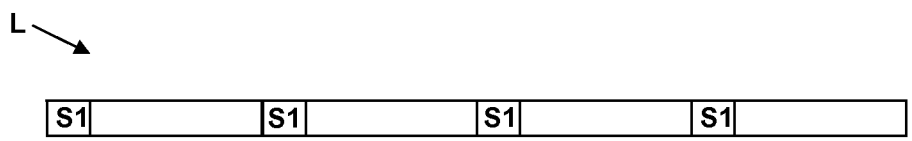
Figure 3:
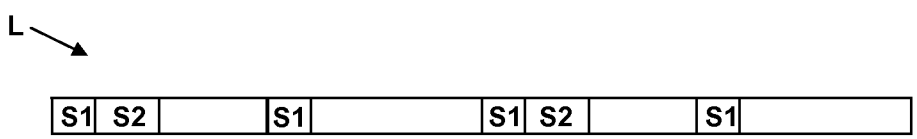
Figure 4:
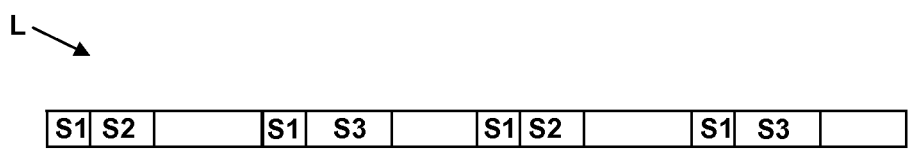

As illustrated in FIG. 1, in this embodiment, the table length (T) of the time table (L) is determined to be as 4 ms since the data exchange period of those sensors (fifth sensor S5 and sixth sensor S6) having the longest data exchange period is 4 ms. Additionally, since the data exchange period of the sensor (first sensor S1) having the shortest data exchange period is 1 ms, the time table (L) is split into 4 subunits (R) each having a subunit length (P) of 1 ms. Then, as illustrated in FIG. 2, first the first sensor (S1) is placed to the subunits (R) in the time table (L) since this sensor has the shortest data exchange period. Then, as illustrated in FIGS. 3-5, the second sensor (S2), the third sensor (S3), and the fourth sensor (S4) each having a longer data exchange period when compared to that of the first sensor (S1) are placed in sequence to the corresponding subunits (i.e. the first subunit (R) having the largest time gap) of the time table (L). Finally, as illustrated in FIGS. 6 and 7, the fifth sensor (S5) and the sixth sensor (S6) having the longest data exchange periods are placed to the corresponding subunits (R). This process is continued until not empty place is left in the time table (L) or until all sensors (S1-S6) are placed. Thus, each sensor (S1-S6) is placed to the subunits (R) present in the time table (L). Additionally, empty times remain in each subunit (R) after each sensor is placed to the subunits (R). This, in turn, makes the time table (L) flexible against the lags of sensors.

According to a further preferred embodiment, the data exchange periods and the data exchange durations of each sensor is periodically measured and the time table (L) is updated according to actual data. Thus, even if a change occurs in the data exchange periods or in the data exchange durations of the sensors, a safe data exchange is ensured between the sensors and the control unit.

According to another preferred embodiment, the synchronous and consecutive data exchange durations with the control unit of two sensors making a consecutive data exchange with the control unit are calculated. According to this embodiment, if the synchronous data exchange durations of the sensors with different control units with which they establish a wireless connection so as to meet their energy requirements is shorter than their consecutive data exchange durations, the sensors can perform a synchronous data exchange with the control unit. Otherwise, each sensor makes a data exchange with the control unit only within the limits of data exchange duration reserved to it. Thus, the data exchange between the sensors and the control unit can be performed in a rapid manner.

According to an alternative embodiment, the length of the time table (L) is equal to the least common multiple of the data exchange period of each sensor with the control unit. According to this embodiment, even when the data exchange periods of the sensors are not changed in folds (e.g. 1 ms, 2 ms, 3 ms, etc., but not 1 ms, 2 ms, 4 ms, etc.), the time table (L) can be used in a periodic manner (i.e. when the end of the table length is reached it is turned to the beginning of the table length).

According to another alternative embodiment, the length (P) of each subunit is equal to the greatest common divisor of the data exchange period of each sensor with the control unit. Thus, even if the data exchange periods of the sensors are not changed in folds (e.g. 1 ms, 2 ms, 3 ms, etc., but not 1 ms, 2 ms, 4 ms, etc.), they can be placed to the same time table (L).

In result, the method makes it possible to perform a regular data exchange between wireless sensors and a control unit provided in a vehicle using a single time table (L). Additionally, by updating the time table (L) with actual or current information and leaving empty time gaps in the subunits (R) of the time table (L), a safe data exchange can be made even if a change occurs in the data exchange durations and periods between the sensor and the control unit.

The invention claimed is:

1. A method for generating a time table determining data exchange times between at least one control unit and at least two wireless sensors in a vehicle which comprises the steps of: said at least one control unit controlling functioning of the vehicle; and said at least two wireless sensors detecting properties of components of the vehicle and/or surrounding parameters, and carrying out data exchange with the control unit by establishing a wireless connection with at least one wireless port provided in the control unit; calculating, by the control unit, data exchange periods and/or data exchange durations between each of the at least two sensors and the control unit; generating, by the control unit a time table having an adjustable table length according to the calculated data exchange periods and/or predetermined data exchange periods and/or the calculated data exchange durations; splitting, by the control unit, the time table into subunits according to the calculated data exchange periods and/or the predetermined data exchange periods and/or the calculated data exchange durations; and entering, by the control unit, times at which each of said at least two sensors is to perform data exchange with the control unit into the table according to a predefined order of priority, the predefined order of priority being calculated based on the calculated data exchange periods and/or the calculated data exchange durations of each of the at least two respective sensors wherein the predefined order of priority is such that a sensor having a shortest data exchange period is prioritized first in the time table and a sensor having the longest data exchange period is prioritized last in the time table.

2. The method according to claim 1, wherein the adjustable table length of the time table is determined, by the control unit, to be equal to a data transmission period of a sensor having a longest data transmission period.

3. The method according to claim 1, wherein the adjustable table length of the time table is determined, by the control unit, to be equal to a least common multiple of the data exchange period of each sensor with the control unit.

4. The method according to claim 1, wherein a subunit length of each subunit of the time table is equal.

5. The method according to claim 4, wherein the subunit length of each subunit is determined, by the control unit, to be equal to a data transmission period of a sensor having the shortest data transmission period.

6. The method according to claim 4, wherein the subunit length of each subunit is determined, by the control unit, to be equal to a greatest common divisor of a data exchange period of each of the at least two sensors.

7. A method for generating a time table determining data exchange times between at least one control unit and at least two wireless sensors in a vehicle, the method comprising the steps of: said at least one control unit controlling functioning of the vehicle; and said at least two wireless sensors detecting properties of components of the vehicle and/or surrounding parameters, and carrying out data exchange with the control unit by establishing a wireless connection with at least one wireless port provided in the control unit; calculating, by the control unit, data exchange periods and/or data exchange durations between each of the at least two sensors and the control unit; generating, by the control unit a time table having an adjustable table length according to the calculated data exchange periods and/or predetermined data exchange periods and/or the calculated data exchange durations; splitting, by the control unit, the time table into subunits according to the calculated data exchange periods and/or the predetermined data exchange periods and/or the calculated data exchange durations; and entering, by the control unit, times at which each of said at least two sensors is to perform data exchange with the control unit into the table according to a predefined order of priority, the predefined order of priority being calculated based on the calculated data exchange periods and/or the calculated data exchange durations of each of the at least two respective sensors, wherein during the step of entering the times at which each sensor is to perform data exchange with the control unit into the table according to a predefined order of priority, each sensor is placed to that subunit first which has the greatest time gap in the table.

8. The method according to claim 1 further comprising the steps of
measuring, by the control unit, the data exchange periods and the data exchange durations of each of the at least two sensors in a periodic manner, and
updating the time table according to the measured data exchange periods or data exchange durations of each of the at least two sensors.

9. A method for generating a time table determining data exchange times between at least two control units and at least two wireless sensors in a vehicle, the method comprising the steps of: said at least two control units controlling functioning of the vehicle; and said at least two wireless sensors detecting properties of components of the vehicle and/or surrounding parameters, and carrying out data exchange with the at least two control units by establishing a wireless connection with at least one wireless port provided in each of the at least two control units; calculating, by at least one of the at least two control units, data exchange periods and/or data exchange durations between each of the at least two sensors and the at least two control units; generating, by at least one of the at least two control units a time table having an adjustable table length according to the calculated data exchange periods and/or predetermined data exchange periods and/or the calculated data exchange durations; splitting, by at least one of the at least two control units, the time table into subunits according to the calculated data exchange periods and/or the predetermined data exchange periods and/or the calculated data exchange durations; and entering, by at least one of the at least two control units, times at which each of said at least two sensors is to perform data exchange with the at least two control units into the table according to a predefined order of priority, the predefined order of priority being calculated based on the calculated data exchange periods and/or the calculated data exchange durations of each of the at least two respective sensors, and calculating, by at least one of the at least two control units, synchronous and consecutive data exchange durations of the at least two sensors making consecutive data exchanges with the at least two control units with which the at least two sensors are in wireless communication.

11. The method according to claim 9, wherein if the synchronous and consecutive data exchange durations of said at least two sensors with the at least two control units with which they are in wireless communication is shorter than their consecutive data exchange durations, the at least two sensors perform a synchronous data exchange with the at least two control units.

11. The method according to claim 9, wherein if the synchronous data exchange durations of said at least two sensors with the at least two control units with which they are in wireless communication is longer than their consecutive data exchange durations, the at least two sensors perform a consecutive data exchange with the at least two control units.

* * * * *